United States Patent [19]

Hirsch et al.

[11] Patent Number: 4,672,845

[45] Date of Patent: Jun. 16, 1987

[54] POLISH ROD TEMPERATURE SENSING SYSTEM AND ROD STROKING CONTROL

[75] Inventors: Michael Hirsch, Pacific Palisades; Peter D. Kristensen, Hawthorne, both of Calif.; William W. Dunn, San Antonio, Tex.

[73] Assignee: Production Monitoring and Control Co., San Antonio, Tex.

[21] Appl. No.: 735,546

[22] Filed: May 20, 1985

[51] Int. Cl.⁴ .............. F04B 49/00; G01K 13/04; E21B 47/10

[52] U.S. Cl. .................. 73/151; 374/208; 417/14; 417/32

[58] Field of Search .......... 374/136, 137, 166, 167, 374/110, 111, 112, 179, 208; 73/151, 154; 417/9, 14, 32

[56] References Cited

U.S. PATENT DOCUMENTS

| 2,707,440 | 5/1955 | Long et al. | 417/32 |
|---|---|---|---|
| 2,843,459 | 7/1958 | Meiklejohn | 73/154 |
| 3,180,134 | 4/1965 | Wadlington | 417/9 |
| 3,327,527 | 6/1967 | Arps | 73/154 |
| 3,398,690 | 8/1968 | Deaton | 417/32 |
| 3,479,877 | 1/1969 | Allen et al. | 374/31 |
| 3,708,245 | 1/1973 | King | 417/13 |
| 3,874,232 | 4/1975 | Hardison | 374/136 |
| 4,017,214 | 4/1977 | Smith | 417/9 |
| 4,311,047 | 1/1982 | Hubbard, Jr. et al. | 73/151 |
| 4,324,138 | 4/1982 | Davis et al. | 374/111 |
| 4,363,605 | 12/1982 | Mills | 73/151 |
| 4,384,793 | 5/1983 | O'Brien | 374/115 |
| 4,468,959 | 9/1984 | Roberts | 73/151 |
| 4,498,789 | 2/1985 | Kiss et al. | 374/166 |

Primary Examiner—Charles Frankfort
Assistant Examiner—W. Morris Worth
Attorney, Agent, or Firm—William W. Haefliger

[57] ABSTRACT

A well polish rod temperature sensing system, for use at a well head, comprising (a) first sensor located in proximity to the polish rod to sense its temperatures $T_1$, (b) second sensor for sensing temperature $T_2$ of the environment near the well head, (c) and circuitry operatively connected to the first and second sensor to provide an output signal which is a function of the difference between $T_1$ and $T_2$.

11 Claims, 7 Drawing Figures

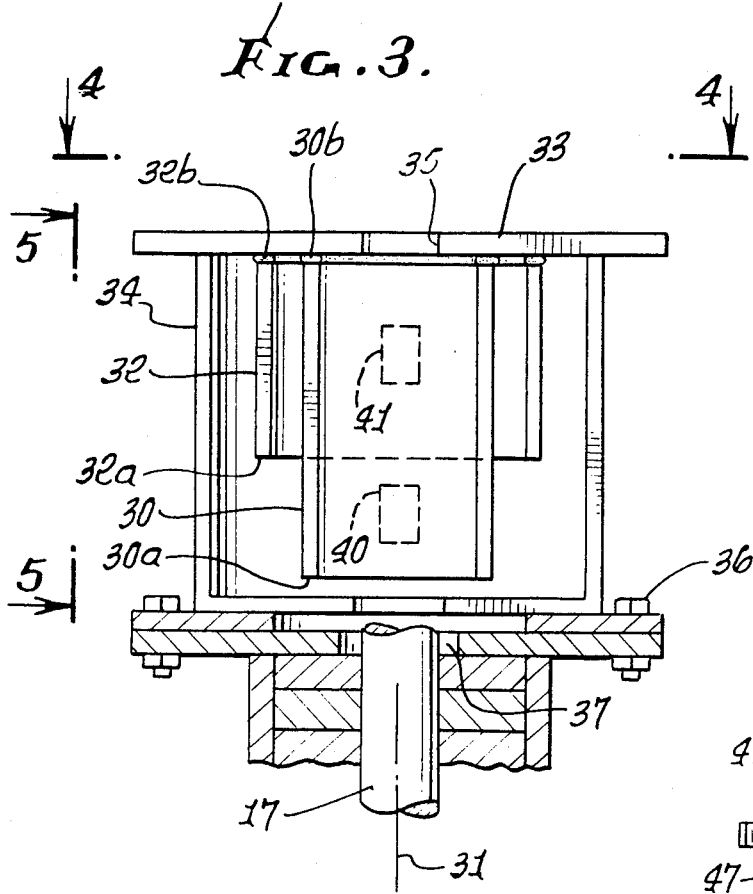
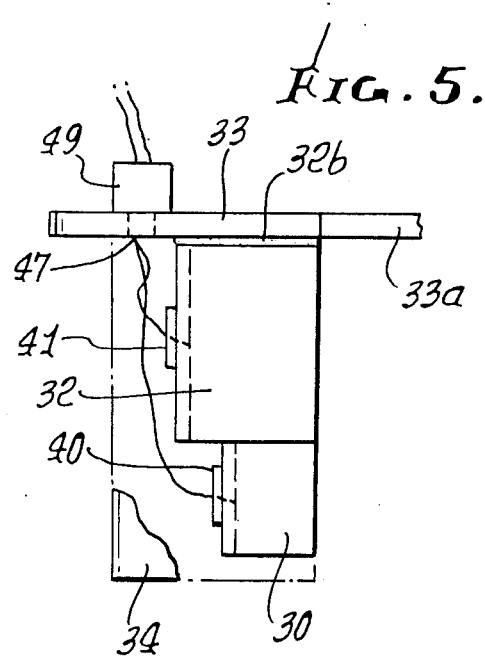
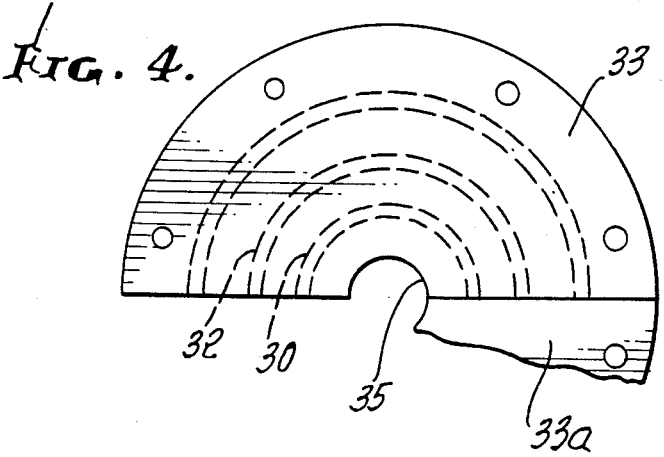

POLISH ROD TEMPERATURE SENSING SYSTEM AND ROD STROKING CONTROL

BACKGROUND OF THE INVENTION

This invention relates generally to apparatus and method for determining temperatures at well heads, and more particularly to sensing of changes in temperatures at or proximate well pump polish rods, and to sensing of well fluid leakage at the well head.

The majority of oil wells which are pumped, as contrasted to those flowing as a result of internal pressure, employ a deep well pump connected by sucker rods to a driving mechanism on the earths' surface at the well head. The top-most link in this connecting system is known as the polish rod because it slides up and down through a sealing gland, called a stuffing box, at the well head. The polish rod, because of its location on the sucker rod string, is accessible to temperature measurement. Further its temperature reflects conditions relative to the operation of the well, such as:

(a) The tightness of the sealing gland;
(b) The presence or lack of well fluid at the top of the well;
(c) The increase in well fluid temperature when not flowing (as in pump off); and
(d) The leakage of well fluid past the wellhead seal.

Although temperature changes in or of the polish rod may be relatively slight as in the case of the above mentioned conditions, the change of temperature will be a significant amount relative to the difference in temperature of the rod and its environment. This change in temperature difference can be used to diagnose problems in well or pump operation, to provide warnings which will permit avoidance of continued operation under adverse conditions, and to effect changes in well control, these being needs which exist in operation of wells.

SUMMARY OF THE INVENTION

It is a major object of the invention to provide simple, effective and useful apparatus and methods, meeting the above needs. Basically, the apparatus of the invention provides a well polish rod temperature sensing system for use at a well head, the apparatus comprising:

(a) first means located in proximity to the polish rod to sense its temperaturs $T_1$,
(b) second means for sensing temperature $T_2$ of the environment near the well head,
(c) and circuitry operatively connected to said first and second means to provide an output signal which is a function of the difference between $T_1$ and $T_2$.

Typically, and as will appear, two temperature sensors are mounted on coaxial semicircular receptors or arcs to reflect, respectively, the temperature of the polish rod and the temperature of the wall of a container or housing. The temperature difference between these receptors is small relative to the changes in polish rod temperature such that a change produces a significant signal which is available for monitoring and control.

Also in accordance with the invention, the container, or housing in which these receptors and their respective temperatures sensors are mounted is fastened to the top of the stuffing box in such a manner as to capture any leakage of well fluid through the wellhead seal or stuffing box gland. As a leak continues, the container fills up so that the receptors on which the temperature sensing means are mounted come into contact with the well fluid. Because the conductivity of the fluid is high relative to the rate of radiation heat transfer, the temperature difference of the receptors will rapidly approach zero providing a signal, indicating leakage.

Further, in accordance with the invention, the receptors are of different lengths such that contact with leaking well fluid is with the longer inside receptor first, and later with the shorter outside receptor. This provides for a two step change in temperature difference which permits an indication of the rate of leakage.

In its method aspects, the invention provides for achieving well polish rod temperature sensing, at a well head, during reciprocation of the rod in a stuffing box, and steps that include (a) providing first means located in proximity to the polish rod to sense its temperature $T_1$,
(b) providing second means for sensing temperature $T_2$ of the environment near the well head,
(c) and employing $T_1$ and $T_2$ to provide an output signal which is a function of the difference between $T_1$ and $T_2$.

As will be seen, the rate of reciprocation of the polish rod may then be decreased in response to a change in said signal which indicates a change in said temperature difference.

Further, the method contemplates providing a housing for said first and second means, and mounting said housing on said stuffing box; and allowing leaking well fluid to rise from said stuffing box into said housing and into contact with said first and second means; whereby dual purposes are achieved for efficient, detection and control of conditions at the well head.

These and other objects and advantage of the invention, as well as the details of an illustrative embodiment, will be more fully understood from the following specification and drawings, in which:

DRAWING DESCRIPTION

FIG. 3 is a section taken in elevation through rod temperature sensing means;

FIG. 4 is a top plan view taken on lines 4—4 of FIG. 3;

FIG. 5 is a fragmentary section taken on lines 5—5 of FIG. 3;

DETAILED DESCRIPTION

Figure 1:
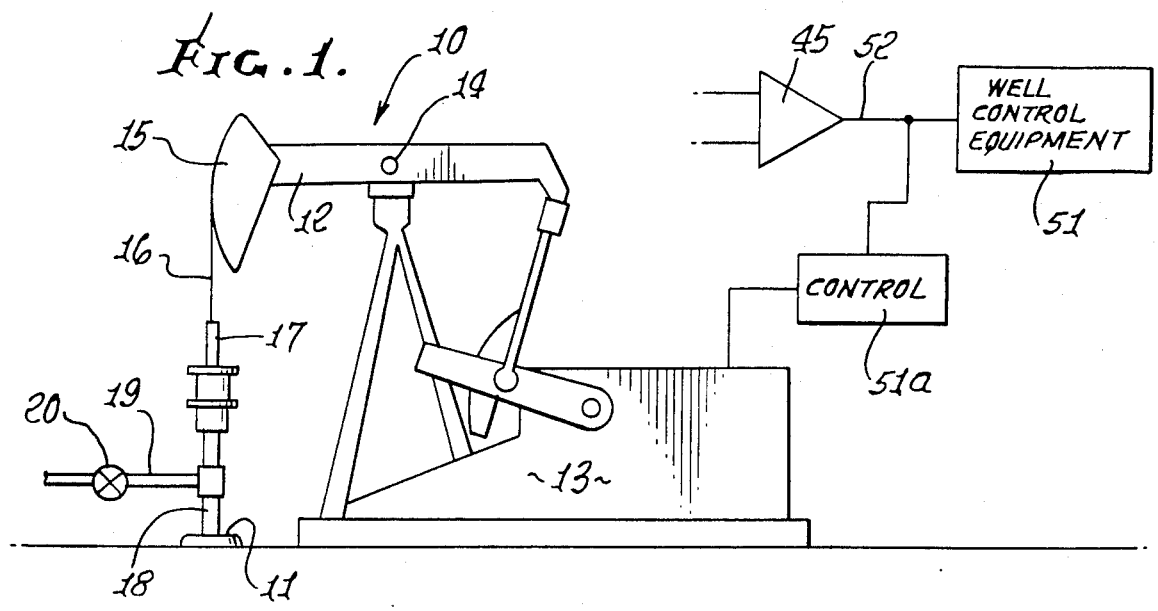
FIG. 1 is a schematic plan view showing of a well head and pumping unit.
Figure 2:
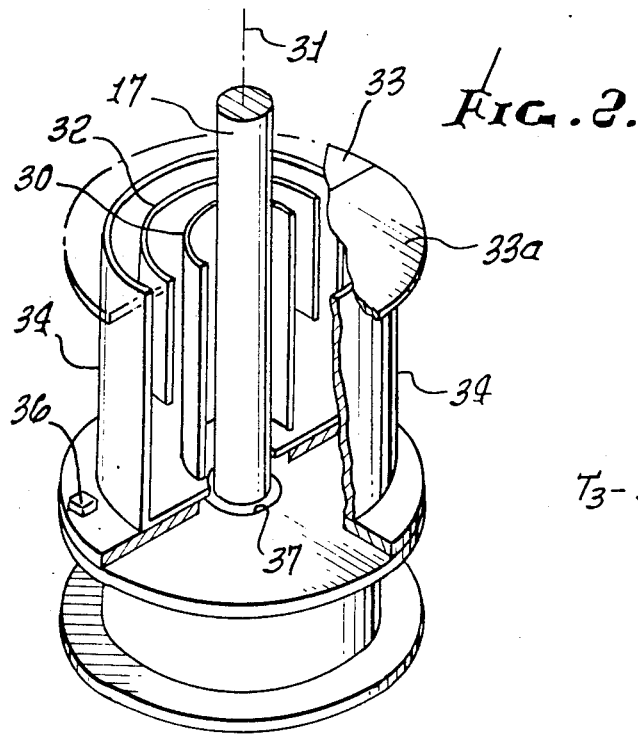
FIG. 2 is a perspective view of a sucker rod stuffing box, and rod temperature sensing means.

As shown in FIG. 1, a pumping unit 10 is located at the head of a well 11. For example, the unit 10 may include a rocking arm 12 operated by motor unit 13, to pivot about fulcrum 14. A horsehead 15 on the arm is connected, by cable 16, to the polish rod 17, to reciprocate the latter up and down, to pump the well. Well pipe 18 receives the rod, and extends downwardly in the well, the pump being located deep in the well and connected to the rod 17 as via sucker rods. Produced well fluid flows via pipe branch 19 and valve 20 to surface piping.

In accordance with the invention, the polish rod temperature sensing system comprises (a) first means located in proximity to the polish rod to sense its temperature $T_1$,
(b) second means for sensing temperature $T_2$ of the environment near the well head,
(c) and circuitry operatively connected to said first and second means to provide an output signal which is a function of the difference between $T_1$ and $T_2$.

In the example, the first means includes first structure, such as arcuate metal plate 30, extending at least partly about the rod (for example about 1.5 radians about the axis 31 of the rod); and the second means includes second structure such as arcuate metal plate 32 also extending at least partly about the rod (for example, about 1.5 radians abut rod axis 31). The two sector plates preferably extend generally concentrically, and the height or vertical dimension of plate 30 exceeds that of the second plate 32, so that plate 30 extends downwardly closer to the stuffing box than plate 32. See lower rims 30a and 32a of plate 30 and plate 32, in FIG. 3. While the plates are described as metallic, they may consist of any thermally conductive material or materials. They may be supported by a top closure section 33, as at connections 30b and 32b; and a housing or container 34 annularly surrounds the structures 30 and 32. Closure section 33, and a complementary semi-circular section 33a close the top of the housing and may be suitably attached to same. They also define vertical opening 35 to pass the polish rod.

Note that cylindrical container 34 is split so that it can be mounted around the polish rod without disconnecting the latter. It is fixed firmly by bolts 36 to the stuffing box and will turn with the box as it is tightened. The lids 33 and 33a to the container slip onto the container and may be indexed by a circumferential rabbit but are not fastened to the container and are, therefore, free to remain in a stable position such that the temperature sensor wiring is not twisted or such that the temperature sensor wiring is not twisted or strained even though the container turns. Fluid from the interior of the stuffing box can leak upwardly via passage 37 to the interior of the container 34. The container including the lid is formed by mating halves of a cylinder and disc which permit assembly around the polish rod. The two halves of the container are equipped with a means for sealing both at the diametrical parting surfaces and around the base where it is fastened to the stuffing box. The halves of the lid are also fastened together with a means for providing rigidity and stability. The half of the lid from which the receptors hang are penetrated by the temperature sensor wiring, as at 47 in FIG. 5. Suitable means for preventing leakage through the lid at that point, such as a flexible grommet is usable. A junction box 49 near the lid permits a connection of the temperature sensors and the data collecting means.

Two temperature sensors 40 and 41 are respectively mounted on the two semicircular and concentric receptors 30 and 32 such that the inside one 40 (or one of smaller radius) is exposed to the polish rod while the outside one 41 (or one of larger radius) is exposed to the wall of the cylindrical container 34.

The receptors 30 and 32 are constructed of a material having a high rate of thermal conductivity such as copper. The container including lid 33 is constructed of a material having a lower rate of thermal conductivity such as a polyurethane plastic. The receptors are typically mounted to the lid 33 of the container such that they are in the same sector of the circular plane created by the container lid with the polish rod at the center. Whether or not the lid is of a material with a low rate of thermal conductivity, the receptors are thermally insulated from any connections to other bodies. The temperature sensors may be thermocouples, semiconductors, temperature transducers, platinum resistance elements, or any other means of temperature measuring. The sensors are connected to a differential amplifier of conventional and suitable design, indicated at 45 in FIG. 1.

The inside temperature sensor arc preferably extends vertically in length so that it is near but not touching the bottom of the cylinder. The outside arc is preferably approximately one half as long as the inside arc, or a length commensurate with the difference in temperature change with time so that the rate of well fluid leaking into and filling the container from the stuffing box can be detected. The inside temperature sensor arc or receptor shields the outside temperature sensor arc from any thermal radiation from the polish rod. Similarly the outside arc shields the inside arc from radiation or accepting radiation from the container wall. As long as the temperature of the polish rod is different from the temperature of the container, there will be a difference in the temperatures of the temperature sensor mounting arcs.

Figure 6:
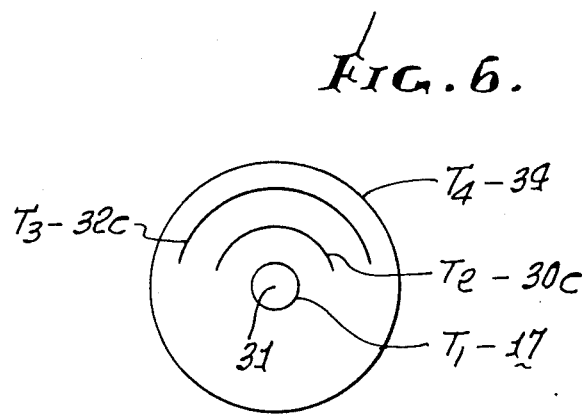
FIG. 6 is a schematic plan view showing principles of the invention.
Figure 7:
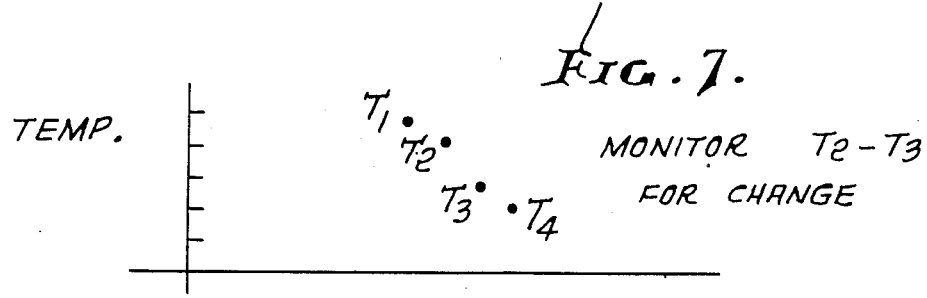
FIG. 7 is a temperature plot.

In operation, the temperature of the polish rod reflects the tightness of the seal at the stuffing box, the temperature of the pumped fluid within the well, and any friction changes within the linkage system. A measurement of its temperature permits the monitoring of changes in the functioning of the rod and the well. The invention provides for monitoring the change in polish rod temperature relative to its environment so that the aforementioned conditions can be analyzed and controlled. The invention also provides for monitoring any leakage of well fluid past the stuffing box seal by virtue of the vertical length of the inside temperature sensor mounting arc being longer than the outside arc. Therefore, any fluid passing the seal and being collected in the temperature sensor container will first come in contact with the inside temperature sensor mounting arc causing a change in its temperature relative to the outside arc. The invention consequently also serves as a stuffing box leak detector. The significant signals for analysis produced by the invention result from the temperature difference between the inside arc and the outside arc. See also arcs 30c and 32c in FIG. 6, corresponding to plates 30 and 32, and temperatures $T_1$-$T_4$ in FIGS. 6 and 7.

FIG. 1 also shows well control equipment 51 receiving the signal (that corresponds to $T_3$-$T_2$ (or $T_2$-$T_3$) at 52 from differential amplifier, that input used by 51 to control desired well equipment. For example, note input 52 also passing to control 51a for the pumping unit 10, to slow the latter if sensed rod heating exceeds same threshold level L, as corresponds to a sensed value $(T_2-T_3)$.

Thus, the method of the invention basically involves achieving well polish rod temperature sensing, at a well head, and the steps that include (a) first means located in proximity to the polish rod to sense its temperature $T_1$,
(b) second means for sensing temperature $T_2$ of the environment near the well head, (c) and circuitry operatively connected to said first and second means to provide an output signal which is a function of the difference between $T_1$ and $T_2$.

Accordingly, the rate of reciprocation of the polish rod may be changed in response to a change in said signal which indicates a change in said temperature difference.

Also, the method includes allowing leaking well fluid to rise from the stuffing box into the housing and into contact with the first and second means. Such leakage will so change the temperature difference between $T_2$ and $T_3$ that the altered output signal at 52 may be employed to shut down the pumping unit, for example.

We claim:

1. A well polish rod temperature sensing system, installed at a well head, comprising
    (a) first means including a first temperature sensor located in proximity to the polish rod to sense its temperature $T_1$,
    (b) second means including a second temperature sensor, for sensing temperature $T_2$ of the environment near the well head,
    (c) and circuitry operatively connected to said first and second means to provide an output signal which is a function of the difference between $T_1$ and $T_2$,
    (d) said first means including first structure extending at least part way about the polish rod, and said second means includes second structure spaced from said first structure, said second structure and second temperature sensor shielded by said first structure from direct exposure to the polish rod,
    (e) there being a split housing containing said first and second means, the housing being non-metallic,
    (f) and the polish rod extending vertically through the housing.

2. The system of claim 1 wherein said first structure extends generally vertically at one side of the polish rod, and said second structure also extends vertically at said one side of the polish rod but further from the polish rod than said first structure, the height of said second structure being less than the height of said first structure.

3. The system of claim 2 wherein said first and second structures define arcs extending part way about the polish rod, said structures being metallic.

4. The system of one of claims 2 or 3 wherein said first and second temperature sensors are respectively carried by said first and second structures.

5. In a well polish rod temperature sensing system installed at a well head polish rod stuffing box location, and connected to circuitry whose output changes as a function of the temperature change of the polish rod, the combination comprising
    (a) first means including a first temperature sensor located in proximity to the polish rod to sense its temperature $T_1$,
    (b) second means including a second temperature sensor for sensing temperature $T_2$ of the environment near the well head,
    (c) said first and second sensors connected to said circuitry,
    (d) and a housing containing said first and second means and adapted for installation at a well head in association with the polish rod stuffing box,
    (e) said first means including first structure extending at least part way about the polish rod, and said second means including second structure shielded by said first structure from direct exposure to the polish rod, said first structure extending generally vertically at one side of the polish rod, and said second structure also extending vertically at said one side of the polish rod but further from the polish rod than said first structure, the height of said second structure being less than the height of said first structure,
    (f) there being a housing connected to and extending above the stuffing box and containing said first and second means, the polish rod extending vertically through the housing.

6. The system of claim 5 wherein said first and second structures define arcs extending part way about the polish rod.

7. The system of claim 5 wherein said first and second temperature sensors are respectively carried by said first and second structures.

8. The system of claim 5 including said polish rod stuffing box mounting said housing so that well fluid leakage from the stuffing box enters said housing to rise toward said first and second means.

9. The system of claim 8 wherein there is a passage for well fluid to rise from the stuffing box into said housing and into successive contact with said second and first means.

10. In the method of achieving well polish rod temperature sensing, at a well head, during reciprocation of the rod in a stuffing box, the steps that include
    (a) installing first means including a first temperature sensor in proximity to the polish rod to sense its temperature $T_1$,
    (b) installing second means including a second temperature sensor for sensing temperature $T_2$ of the environment near the well head,
    (c) and employing $T_1$ and $T_2$ to provide an output signal which is a function of the difference between $T_1$ and $T_2$,
    (d) said first means including first structure installed to extend at least part way about the polish rod, and said second means including second structure installed in spaced relation to said first structure, whereby said second structure and second temperature sensor are shielded by said first structure from direct exposure to the polish rod,
    (e) and including providing a housing for said first and second means, and mounting said housing on said stuffing box, and to extend about said first and second means, the polish rod extending vertically through the housing.

11. The method of claim 10 including allowing leaking well fluid to rise from said stuffing box into said housing and into contact with said first and second means.

* * * * *